(12) United States Patent
Weisshaupt et al.

(10) Patent No.: US 11,463,409 B2
(45) Date of Patent: Oct. 4, 2022

(54) SYSTEM AND METHOD OF UTILIZING NETWORK SECURITY DEVICES FOR INDUSTRIAL DEVICE PROTECTION AND CONTROL

(71) Applicant: Barracuda Networks, Inc., San Jose, CA (US)

(72) Inventors: Martin Weisshaupt, Innsbruck (AT); Reinhard Staudacher, Innsbruck (AT); Christoph Rauchegger, Innsbruck (AT)

(73) Assignee: Barracuda Networks, Inc., Campbell, CA (US)

( * ) Notice: Subject to any disclaimer, the term of this patent is extended or adjusted under 35 U.S.C. 154(b) by 118 days.

(21) Appl. No.: 17/179,972

(22) Filed: Feb. 19, 2021

(65) Prior Publication Data
US 2021/0185010 A1 Jun. 17, 2021

Related U.S. Application Data
(62) Division of application No. 16/170,859, filed on Oct. 25, 2018, now Pat. No. 11,050,714.
(Continued)

(51) Int. Cl.
*H04L 29/06* (2006.01)
*H04L 9/40* (2022.01)
(Continued)

(52) U.S. Cl.
CPC ...... *H04L 63/0263* (2013.01); *G05B 19/4185* (2013.01); *H04L 63/101* (2013.01);
(Continued)

(58) Field of Classification Search
CPC ............ H04L 63/0263; H04L 63/1416; H04L 63/1441; H04L 63/20; H04L 67/025; H04L 67/12; H04L 63/101; G05B 19/4185
See application file for complete search history.

(56) References Cited

U.S. PATENT DOCUMENTS 9,692,784 B1 * 6/2017 Nenov ................ H04L 63/0245
10,594,734 B1 * 3/2020 Rappard ............. H04L 63/0236
(Continued)

OTHER PUBLICATIONS

Sivaraman et al., "Network-level security and privacy control for smart-home IoT devices", 2015 IEEE 11th International Conference on Wireless and Mobile Computing, Networking and Communications (WiMob), Oct. 19-21, 2015.*

*Primary Examiner* — Morshed Mehedi

(57) ABSTRACT

A new network security device/appliance is proposed to not only protect, but also to control and operate an industrial IoT device. Specifically, the network security device is configured to detect and block cyber attacks such as viruses, hacking attempts, and other types of cyber threats launched from an outside network against the industrial IoT device based on a set of configurable rules. In addition, the network security device is further configured to control and operate the industrial IoT device remotely in response to the cyber attacks by issuing and communicating certain instructions/command to the industrial IoT device. Besides accepting and executing control command from the network security device, the industrial IoT device is also configured to send a request to the network security device to make certain adjustments to the rules concerning network traffic directed to the industrial IoT device.

20 Claims, 6 Drawing Sheets

Related U.S. Application Data

(60) Provisional application No. 62/700,779, filed on Jul. 19, 2018.

(51) Int. Cl.
    *G05B 19/418*     (2006.01)
    *H04L 67/025*     (2022.01)
    *H04L 67/12*     (2022.01)

(52) U.S. Cl.
    CPC ...... *H04L 63/1416* (2013.01); *H04L 63/1441* (2013.01); *H04L 63/20* (2013.01); *H04L 67/025* (2013.01); *H04L 67/12* (2013.01)

(56) References Cited

U.S. PATENT DOCUMENTS

| | | | |
|---|---|---|---|
| 10,742,674 B1* | 8/2020 | McLinden | H04L 63/1416 |
| 2017/0155703 A1* | 6/2017 | Hao | H04W 4/70 |
| 2018/0007058 A1* | 1/2018 | Zou | H04L 63/08 |
| 2018/0287869 A1* | 10/2018 | Munafo | H04W 12/069 |
| 2018/0375887 A1* | 12/2018 | Dezent | H04L 41/142 |
| 2019/0380037 A1* | 12/2019 | Lifshitz | H04W 8/08 |

* cited by examiner

SYSTEM AND METHOD OF UTILIZING NETWORK SECURITY DEVICES FOR INDUSTRIAL DEVICE PROTECTION AND CONTROL

CROSS-REFERENCE TO RELATED APPLICATIONS

This application is a divisional application of U.S. patent application Ser. No. 16/170,859, filed Oct. 25, 2018, and entitled "System and Method of Utilizing Network Security Devices for Industrial Device Protection and Control," which claims the benefit of U.S. Provisional Patent Application No. 62/700,779, filed Jul. 19, 2018, and entitled "System and Method of Combining IT Security Devices with Industrial Machine Controls." Both applications are incorporated herein in their entireties by reference.

BACKGROUND

Information technology (IT)/network security devices/appliances, such as firewalls, are hardware or computing devices combined with specialized software running on the hardware located at important checkpoint(s) of a network of a company and are dedicated to protecting the IT systems and devices of the company from unauthorized access originated from outside network. Traditionally, the protected systems and devices can be, for non-limiting examples, conventional computers such as desktops, laptops, and server machines, and communication devices such as mobile devices used by employees of the company. With the rapid progress of digitalization of technology, companies are increasingly seeking to connect to the Internet, not just conventional/standard computing and communication devices, but also various types of Internet of things (IoT) devices, which include but are not limited to network-enabled as well as traditional/non-internet-enabled physical machines used in industrial production and/or consumer electronic devices, in order to achieve a more centralized control and monitoring mechanism.

As these IoT devices are now increasingly being connected to the Internet, they automatically become potential targets for cyber intruders and hackers, and attackers, therefore need to be protected from potential cyber attacks. These IoT devices, however, are often not designed or configured to provide many of the characteristics/data protection measures that firewalls typically rely on. For a non-limiting example, if a hacking attempt is observed or a virus is being downloaded, the firewall will detect and display a block page to a user of a conventional computer to alert him/her of what is going on. In the case of an industrial robot, which is usually un-manned and does not necessarily have a display or the required software for an operator, however, the industrial robot and/or its operator might not be able to react accordingly to such attack. In addition, simply blocking the network attack might not be sufficient in many cases, as the industrial robot may also be performing physical tasks and the operator of the industrial robot might want to separate it from the system entirely in order to prevent damage it may cause if the industrial robot has been compromised and potentially is under control of an unauthorized hacker. Current firewalls do not provide these separation features. Thus, there is a need for a new security approach that is capable of protecting industrial IoT devices from potential cyber attacks.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1A:
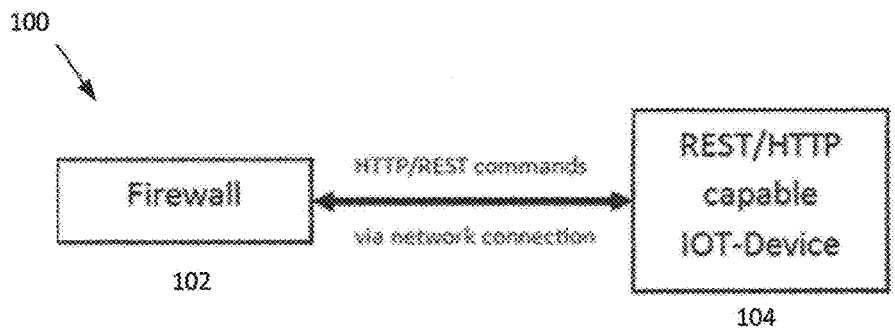
FIGS. 1A-B depict examples of system diagrams to support utilizing network security devices for industrial IoT device protection and control in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new network security device/appliance (e.g., firewall) is proposed to not only protect, but also to control and operate an industrial IoT device. Specifically, the network security device is configured to detect and block cyber attacks such as viruses, hacking attempts, and other types of cyber threats launched from an outside network against the industrial IoT device based on a set of configurable rules. In addition, the network security device is further configured to control and operate the industrial IoT device remotely in response to the cyber attacks by issuing and communicating certain instructions/commands to the industrial IoT device. Besides accepting and executing control commands from the network security device, the industrial IoT device is also configured to send a request to the network security device to make certain adjustments to the rules concerning network traffic directed to the industrial IoT device. Here, the network security device and the industrial IoT device are configured to communicate with each other over a communication protocol.

By enabling control of operations of the industrial IoT device by the network security device via two-way communication between the devices, the proposed network security device can not only protect the industrial IoT device against various kinds of cyber attacks like a conventional firewall, it is also capable of directly controlling the industrial IoT device to perform certain operations in response to the cyber attacks. As such, a human operator is enabled to remotely control the industrial IoT device via the network security device to avoid any potential harm to the industrial IoT device as well as other devices connected to it in the same system even when the industrial IoT device is remotely located away from the human operator. Moreover, the proposed network security device is also configured to accept request from the industrial IoT device to adjust the rules governing the network traffic in case of, for non-limiting examples, an emergency, maintenance, software update, or any other scenarios under which network traffic should be temporarily allowed.

Figure 1B:
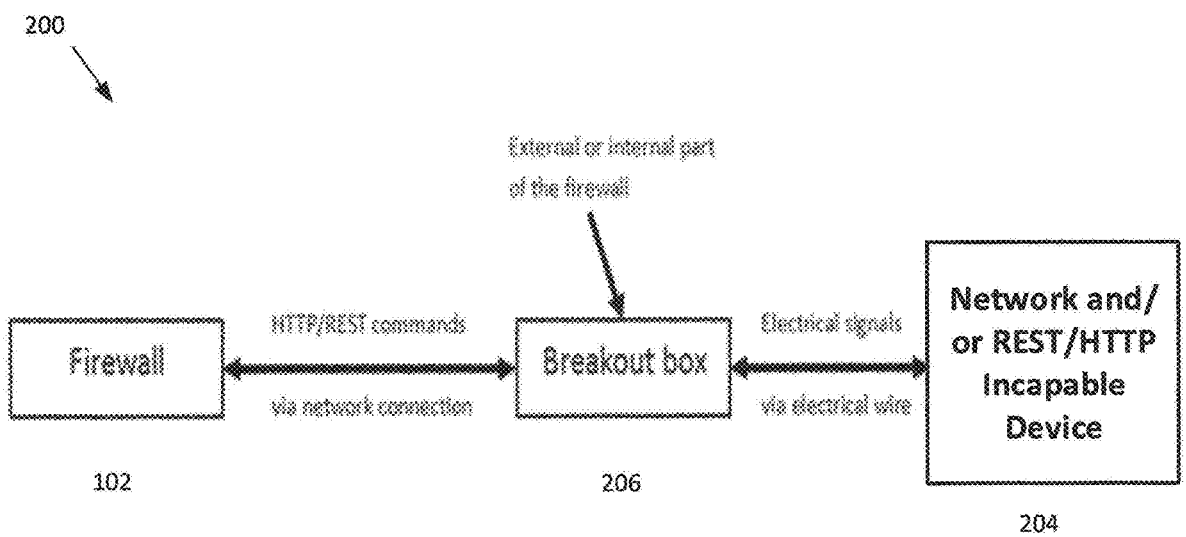

FIGS. 1A-B depict examples of system diagrams to support utilizing network security devices for industrial IoT device protection and control. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1A, the system 100 includes a network security device 102 and a network-enabled industrial IoT device 104. Here, the network security device 102 can be but is not limited to a firewall, which can be a dedicated hardware appliance and/or software running on a computing device, a communication device, or any electronic device capable of running a software component and communicating with the network-enabled industrial IoT device 104. For non-limiting examples, the computing device and/or the communication device can be but is not limited to a laptop PC, a desktop PC, an iPod, an iPhone, an iPad, a Google's Android device, or a server/host/machine. The industrial IoT device 104 can be but is not limited to a physical machine, which for a non-limiting example, can be a robot, used in an industrial production setting. In some embodiments, the industrial IoT device 104 may include one or more microprocessors and on-chip memory units storing software instructions programmed by a user. When executed by the microprocessors, the instructions are configured to control various operations of the industrial IoT device 104.

In the example of FIG. 1A, the network security device 102 reside either locally or remotely (e.g., over a network) from the industrial IoT device 104. The industrial IoT device 104 is network-enabled (e.g., REST/HTTP capable) with an REST and/or HTTP API available for direct bi-directional communication with the network through the network security device 102, wherein each of the devices is capable of receiving requests/commands from and/or issuing commands/requests to the other device. The network security device 102 has at least one communication interface (not shown), which enables the network security device 102 to communicate with the network-enabled industrial IoT device 104 following certain communication protocols, including but not limited to, REpresentational State Transfer (REST) protocol, HTTP or HTTPS protocols, or a proprietary communication protocol, over one or more communication networks (not shown). The communication networks can be but are not limited to, Internet, intranet, wide area network (WAN), local area network (LAN), wireless network, Bluetooth, WiFi, and mobile communication network. The physical connections of the network and the communication protocols are well known to those of skill in the art.

In the example of FIG. 1A, the network security device 102 is configured to inspect network traffic/communications directed towards the industrial IoT device 104 originated from the outside network and to detect and block various cyber attacks against the industrial IoT device 104 protected by the network security device 102, wherein the cyber attacks include but are not limited to viruses, hacking attempts, phishing attacks, and other forms of threats. In some embodiments, if a cyber-attack against the industrial IoT device 104 is detected, the network security device 102 is further configured to communicate with and/or control the industrial IoT device 104 directly to perform certain operations in response to the cyber attack. Here, the operations include but are not limited to, adjusting one or more settings and/or configurations of the industrial IoT device 104, temporarily separating the industrial IoT device 104 from rest of the IoT devices protected by the network security device 102, etc. In some embodiments, the network security device 102 is configured to control the operations of the industrial IoT device 104 by issuing one or more instructions/commands to invoke Application Program Interfaces (API)s of the REST and/or HTTP enabled industrial IoT device 104 following a REST and/or HTTP protocol after a corresponding connection is established between the two devices. In some embodiments, the commands are pre-defined by the user/operator of the industrial IoT device 104 and are customizable to fit the specific needs of the industrial IoT device 104 protected by the network security device 102. In some embodiment, the commands issued by the network security device 102 and the operations/actions taken by the industrial IoT device 104 as a result of executing the commands can be pre-defined, configured, and customized by the network security device 102 and the industrial IoT device 104 as long as such commands and operations are agreed upon by both parties and are feasible to create and executable by the parties.

In some embodiments, the REST and/or HTTP enabled industrial IoT device 104 is configured to communicate with the network security device 102 to make certain request(s) to the network security device 102 following REST and/or HTTP protocols. For a non-limiting example, if the industrial IoT device 104 is in a maintenance phase, the industrial IoT device 104 may send a request to the network security device 102 serving as a firewall to turn on/activate an otherwise deactivated network traffic rule and thus allow the maintenance traffic to coming in to the industrial IoT device 104 for maintenance purposes.

Figure 2A:
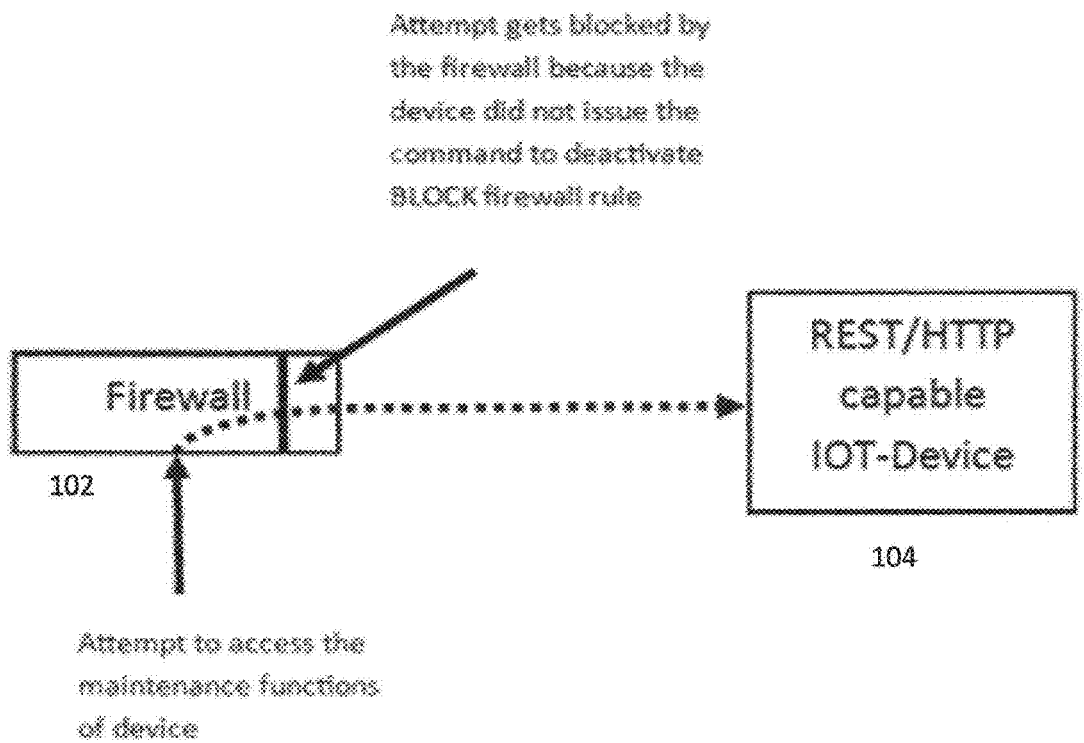
FIGS. 2A-D depict examples of a use case wherein the network security device and the network-enabled industrial IoT device interact with each other during a planned maintenance of the industrial IoT device in accordance with some embodiments.
Figure 2B:
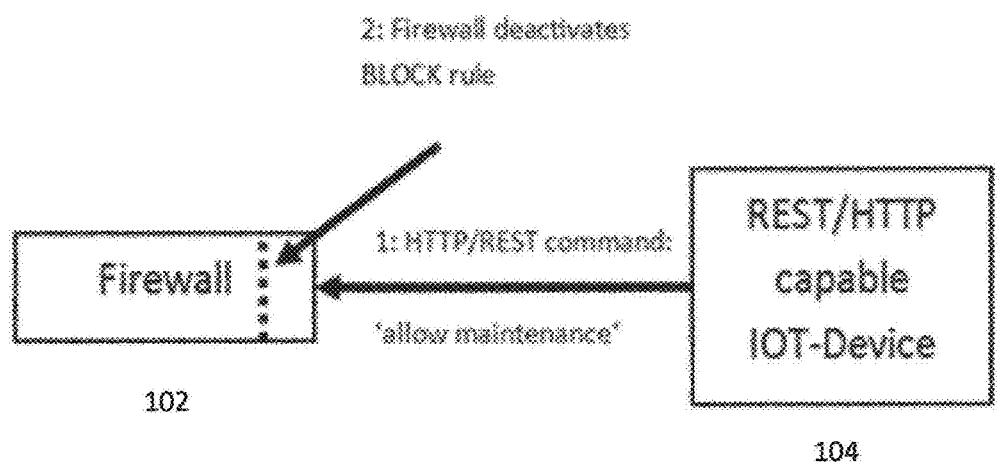
Figure 2C:
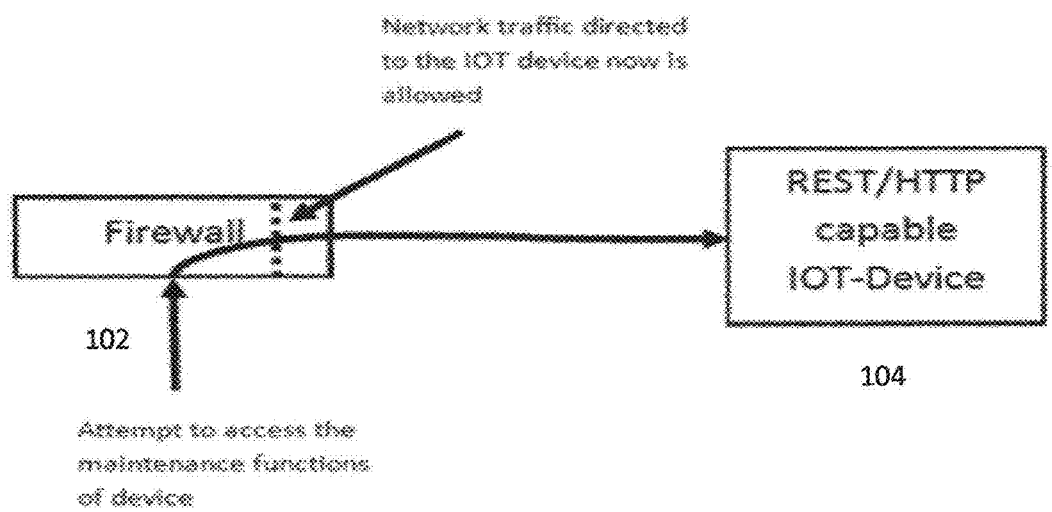
Figure 2D:
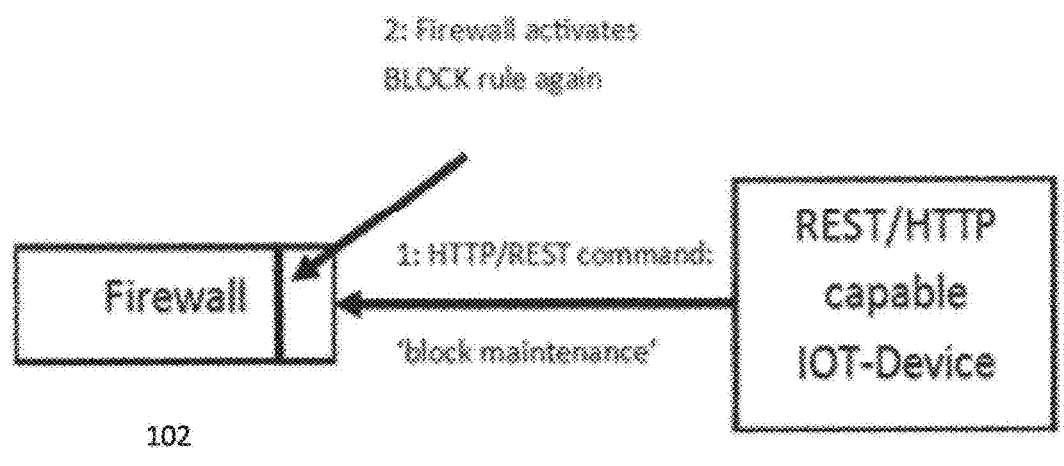

FIGS. 2A-D depict examples of a use case wherein the network security device 102 and the network-enabled industrial IoT device 104 interact with each other during a planned maintenance of the industrial IoT device 104. In some embodiments, the network security device 102 has a list of firewall rules, which describe how to deal with network traffic if the conditions specified in one of the rules are met. the network security device 102 starts comparing incoming traffic with the first rule in the list. If the traffic matches the criteria specified in that specific rule, the the network security device 102 applies a set action in the rule to the traffic (e.g. pass, redirect or block) and stops checking the traffic against any other rule that might follow in the list. If the traffic does not match the criteria specified in the rule, the network security device 102 moves on to the next rule and checks the criteria specified there, which might be completely different ones. If it matches, the network security device 102 applies the action and stops processing the current traffic. If not, the network security device 102 moves on to check the traffic against the next rule. This process continues until the network security device 102 either reaches a rule with matching criteria or the end of the list is reached. In some embodiments, a "Block all rule" is placed at the end of the list, which has criteria set that matches all traffic. As such, an allowed traffic would never reach the "Block all" rule, because another rule will be matching the traffic earlier and the network security device 102 will stop further processing of the traffic. Only traffic not matching any other rule will make it all the way down the list to the "Block all" rule. In the example depicted in FIGS. 2A-D, the network security device 102 may have a block all (network traffic) rule in place as part of the default settings of its firewall to block all unauthorized network access attempt to the industrial IoT device 104 by default as shown by FIG. 2A. In some embodiments, network security device 102 may also have a (network traffic) unblock rule that is deactivated by default and is only activated to allow a specific type of network traffic under certain circumstances and/or events. For a non-limiting example, there can be an "Allow Maintenance" firewall rule, which is deactivated by default and is only activated to allow network traffic during maintenance of the industrial IoT device 104. When an outside access is initiated to access maintenance functions of the industrial IoT device 104 when no maintenance is scheduled or without authorization by the operator of the industrial IoT device 104, such access attempt will be blocked by the network security device 102 by default. When the industrial IoT device 104 is ready for maintenance, it sends a request accordingly to the network security device 102 to allow maintenance communication/traffic to come in. Upon receiving such request from the industrial IoT device 104, the network security device 102 activates the "Allow Maintenance" rule so that maintenance traffic is no longer blocked as shown in FIG. 2B. As a result of the rule change, outside attempt to access the maintenance functions the industrial IoT device 104 will now be allowed to pass through as shown by FIG. 2C. Finally, as shown by FIG. 2D, the industrial IoT device 104 issues a second command to the network security device 102 to deactivate the "Allow Maintenance" firewall rule on the network security device 102 after the maintenance of the network security device 102 is complete and any further traffic to the industrial IoT device 104 will be blocked again until the next maintenance of the industrial IoT device 104.

In some embodiments, the industrial device 204 is not network-enabled, e.g., the industrial device 204 is network-incapable, e.g., it does not have a network, e.g., REST or HTTP API available, and cannot communicate with the network security device 102 directly following a network, e.g., the REST or the HTTP protocol. As such, the network-incapable industrial device 204 can only transmit or receive information/signal via electrical wires (e.g. signal from a button press) or any proprietary protocol supported by the network-incapable industrial device 204. Under such circumstance, the example of the system 200 as depicted in FIG. 1B further includes an additional breakout device/box positioned between the network security device 102 and the network-incapable industrial device 204. Here, the breakout device 206 is network-enabled computing and/or communicating hardware with specific-purposed software running on it. It can either be an external device connected to the network security device 102 or an internal component of the network security device 102. In some embodiments, the breakout device 206 is configured to communicate with the network security device 102 following the REST and/or the HTTP protocol as discussed above. Once a REST and/or HTTP command is received from the network security device 102, the breakout device 206 is configured to convert the REST and/or HTTP command to electrical signals that can be used to control operations of the network-incapable industrial device 204. Conversely, the breakout device 206 is also configured to translate a set of electrical signals from the network-incapable industrial device 204 to a REST and/or HTTP request and communicate such request to the network security device 102 following the REST and/or HTTP protocol, wherein the network security device 102 will act accordingly, e.g., adjust one or more of the configurable rule, in response to the request. For a non-limiting example, the breakout device 206 can be used to control status indicators such as emergency lights when a cyber attack is detected or to accept input signals to the network security device 102 from an external input element such as an alarm switch.

Figure 3A:
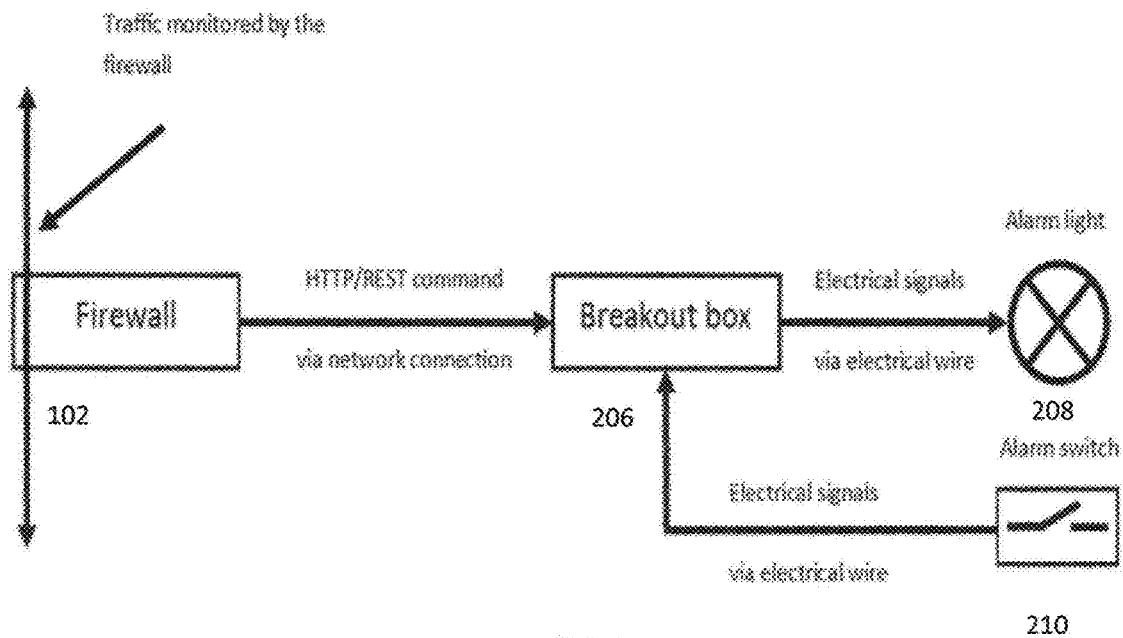
FIGS. 3A-D depict examples of a use case wherein the network security device and the network-incapable industrial IoT devices interact with each other through the breakout device in case of a virus alarm in accordance with some embodiments.
Figure 3B:
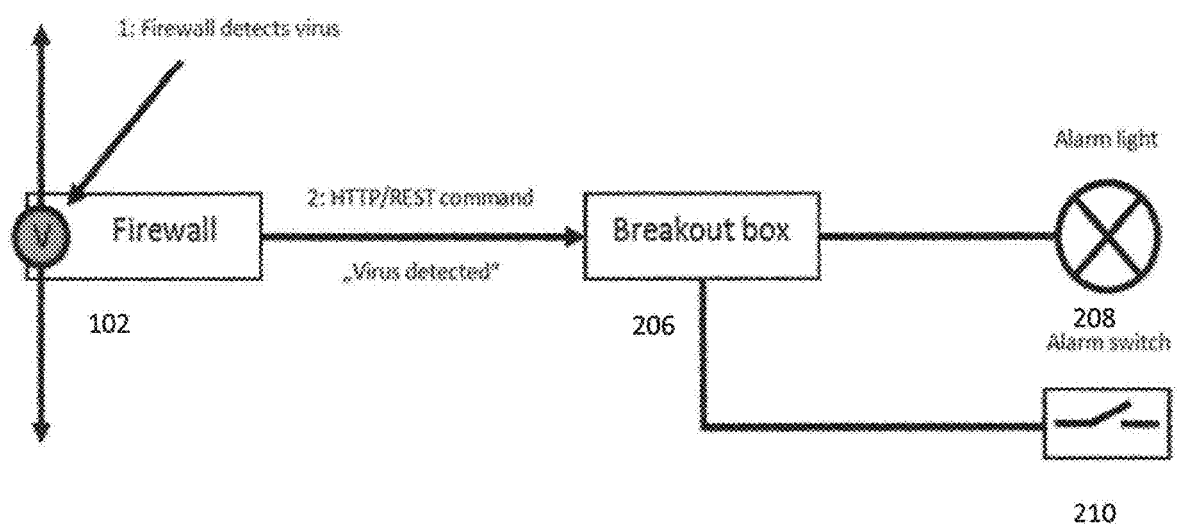
Figure 3C:
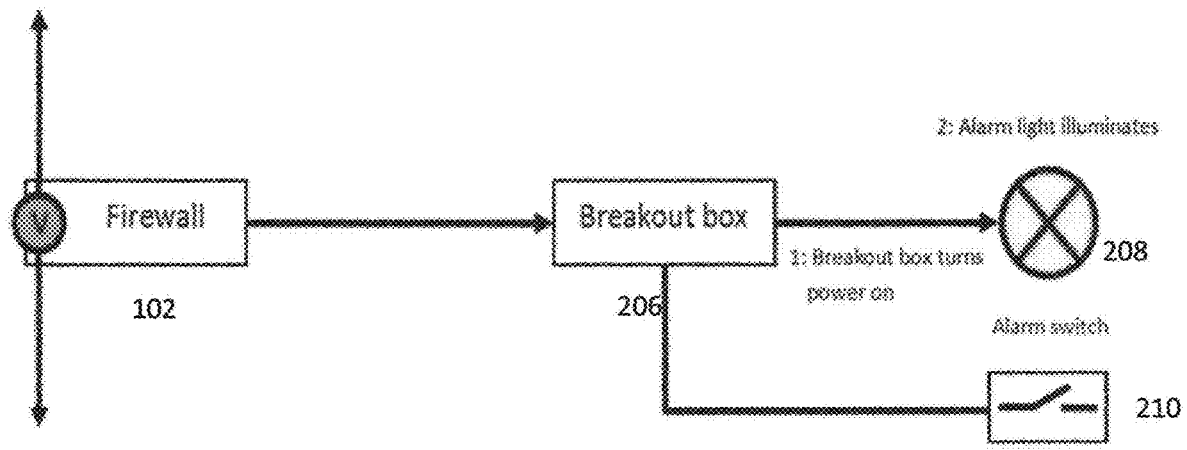
Figure 3D:
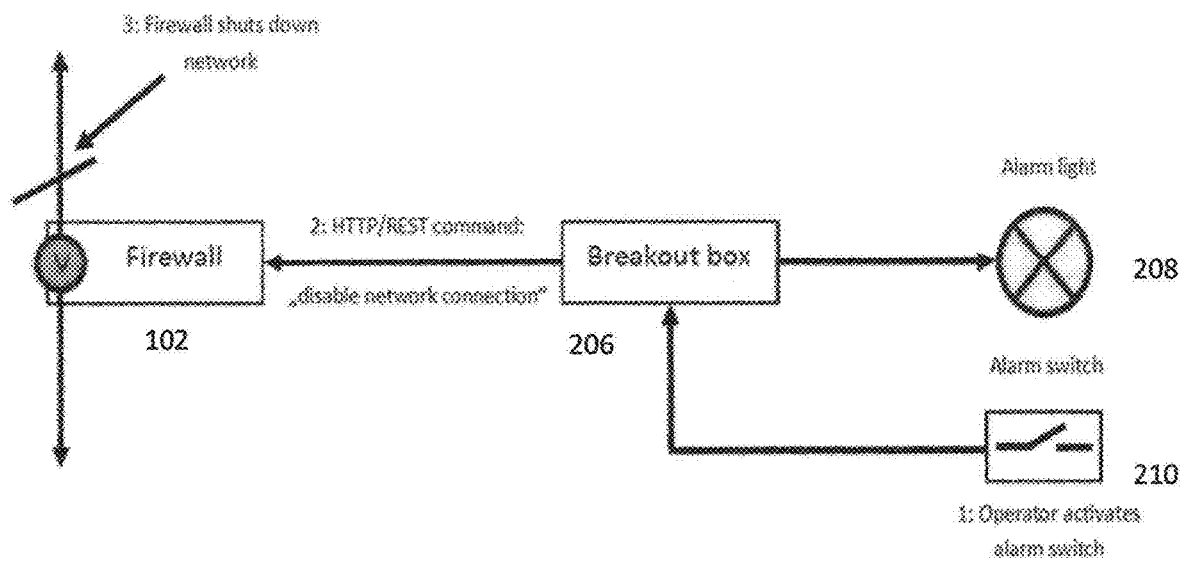

FIGS. 3A-D depict examples of a use case wherein the network security device 102 and the network-incapable industrial devices 204 interact with each other through the breakout device 206 in case of a virus alarm. As shown by FIG. 3A, the breakout device 206 is connected to the network security device/firewall 102 following REST and/or HTTP protocol on one side and two network-incapable industrial IoT devices—alarm/emergency light 208 and an alarm/emergency off switch 210, respectively, via electrical signals on the other side. Here, the network security device 102 monitors network traffic coming into the company/entity. The emergency off switch 210 can turn off a communication (e.g., VPN) tunnel(s) to the industrial IoT devices without going through a regular user interface of the network security device 102. When the network security device 102 detects a cyber attack such as a virus or a hacking attempt, it issues a "Virus detected" command to the breakout device 206 as shown in FIG. 3B. In response to the "Virus detected" command, the breakout device 206 activates/turns on the power to the alarm light 206, which then illuminates as shown in FIG. 3C. The operator then notices the alarm light 208 and proceeds to activate the emergency switch 210 to cut the system off from the outside network. Once the emergency switch 210 is activated, the emergency switch 210 sends an electrical signal to the breakout device 206, which registers this action by the operator and issues an assigned request/command "Disable network connection" to the network security device 102 as shown by FIG. 3D. The network security device 102 then reacts accordingly and shut down traffic from the outside network to counter the cyber attack.

Figure 4:
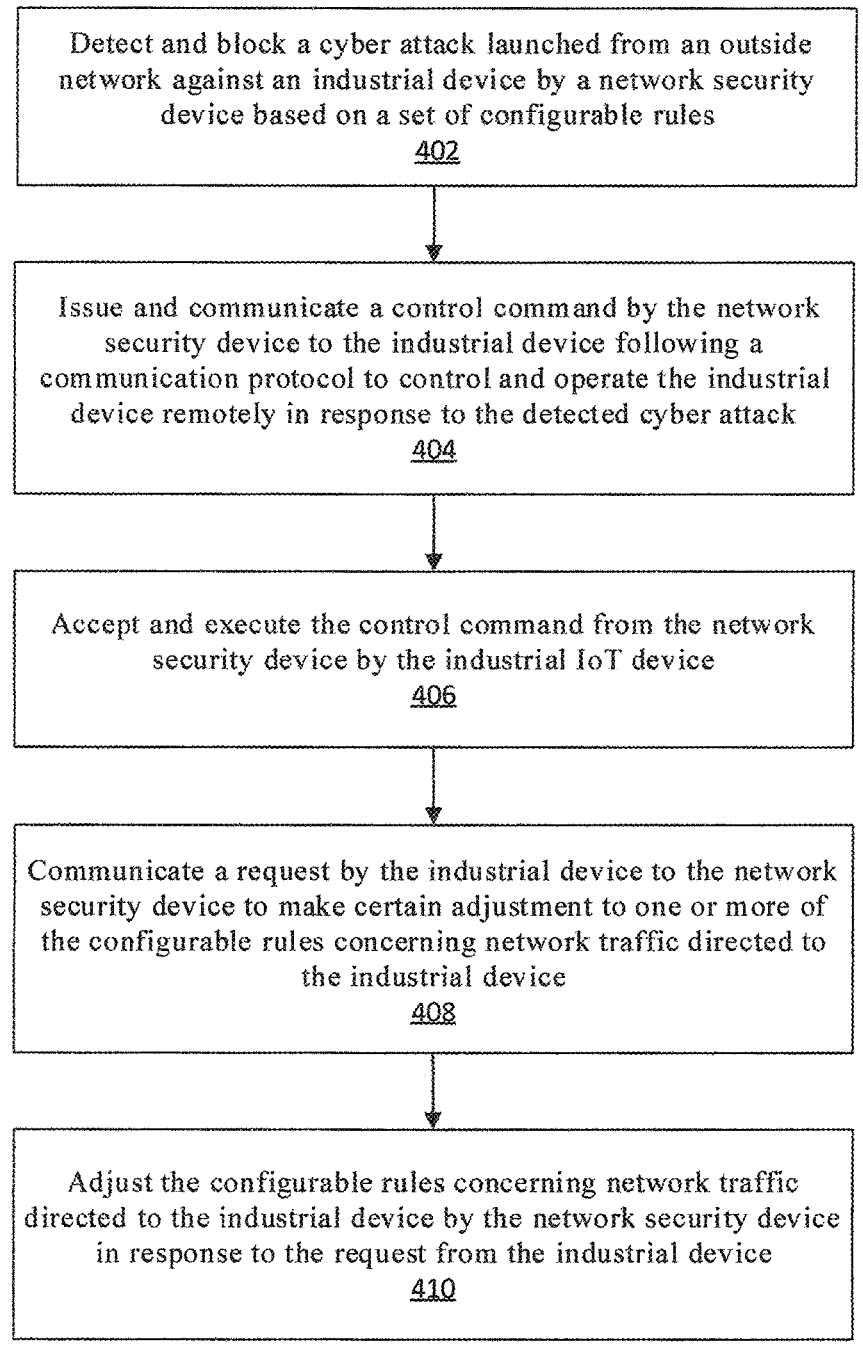
FIG. 4 depicts a flowchart of an example of a process to support utilizing network security devices for industrial IoT device protection and control in accordance with some embodiments.

FIG. 4 depicts a flowchart 400 of an example of a process to support utilizing network security devices for industrial IoT device protection and control. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 4, the flowchart 400 starts at block 402, where a cyber attack launched from an outside network against an industrial device is detected and blocked by a network security device based on a set of configurable rules. The flowchart 400 continues to block 404, where a control command is issued and communicated by the network security device to the industrial device following a communication protocol to control and operate the industrial device remotely in response to the detected cyber attack. The flowchart 400 continues to block 406, where the control command from the network security device is accepted and executed by the industrial device. The flowchart 400 continues to block 408, where a request is communicated by the industrial device to the network security device to make certain adjustment to one or more of the configurable rules concerning network traffic directed to the industrial device. The flowchart 400 ends at block 410 where the configurable rules concerning network traffic directed to the industrial device are adjusted by the network security device in response to the request from the industrial device.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system to support device protection and control, comprising:
   a network security device configured to
      detect and block a cyber attack launched from an outside network based on a set of configurable rules;
      issue and communicate a control command to a network-enabled breakout device following a communication protocol to control and perform an operation of the network-incapable industrial device remotely in response to the detected cyber attack;
      adjust one or more of the configurable rules in response to a request from the network-enabled breakout device;
   a network-enabled breakout device configured to
      accept the control command from the network security device;
      convert the command to a first set of electrical signals to be used to control operations of the network-incapable industrial device;
      accept a second set of electrical signals from the network-incapable industrial device;
      translate the second set of electrical signals from the network-incapable industrial device to said request and communicate the request to the network security device following the communication protocol;
   said network-incapable industrial device configured to
      accept the first set of electrical signals from the network-enabled breakout device and perform the operation of the network-incapable industrial device according to the first set of electrical signals;
      generate and transmit said second set of electrical signals to the network-enabled breakout device.

2. The system of claim 1, wherein:
   the cyber attack is one of virus, a hacking attempt, a phishing attack.

3. The system of claim 1, wherein:
   the network security device is a firewall.

4. The system of claim 1, wherein:
   the network security device resides remotely from the network-incapable industrial device.

5. The system of claim 1, wherein:
   the network-incapable industrial device is an alarm/emergency device.

6. The system of claim 1, wherein:
   the network-enabled breakout device is network-enabled computing and/or communicating hardware with specific-purposed software running on it.

7. The system of claim 1, wherein:
   the network-enabled breakout device is an internal component of the network security device.

8. The system of claim 1, wherein:
   the network-enabled breakout device is an external device connected to the network security device.

9. The system of claim 8, wherein:
   the network-enabled breakout device is configured to communicate with the network security device via a proprietary network communication protocol.

10. The system of claim 8, wherein:
    the network-enabled breakout device is configured to communicate with the network security device via a REpresentational State Transfer (REST), a HTTP or a HTTPS protocol.

11. The system of claim 1, wherein:
    the network-enabled breakout device is configured to activate a status indicator of the network-incapable industrial device when the cyber attack is detected by the network security device.

12. The system of claim 1, wherein:
    the network-enabled breakout device is configured to send the request to the network security device to disable a network connection when the network-incapable industrial device is being switched off.

13. A computer-implemented method to support device protection and control, comprising:
    detecting and blocking a cyber attack launched from an outside network based on a set of configurable rules;
    issuing and communicating a control command to a network-enabled breakout device following a communication protocol to control and perform an operation of the network-incapable industrial device remotely in response to the detected cyber attack;
    accepting the control command from the network security device at a network-enabled breakout device;
    converting the command to a first set of electrical signals to be used to control operations of the network-incapable industrial device;
    accepting the first set of electrical signals from the network-enabled breakout device and perform the operation of the network-incapable industrial device according to the first set of electrical signals;
    generating and transmitting a second set of electrical signals to the network-enabled breakout device;
    accepting the second set of electrical signals from the network-incapable industrial device at the network-enabled breakout device;
    translating the second set of electrical signals from the network-incapable industrial IoT device to a request and communicate the request to the network security device following the communication protocol;
    adjusting the one or more of the configurable rules in response to the request from the network-enabled breakout device.

14. The system of claim 1, wherein:
the network security device resides remotely from the network-incapable industrial device.

15. The system of claim 1, wherein:
the network-enabled breakout device is an internal component of the network security device.

16. The system of claim 1, wherein:
the network-enabled breakout device is an external device connected to the network security device.

17. The method of claim 16, further comprising:
communicating with the network security device by the network-enabled breakout device via a proprietary network communication protocol.

18. The method of claim 16, further comprising:
communicating with the network security device by the network-enabled breakout device via a REpresentational State Transfer (REST), a HTTP, or a HTTPS protocol.

19. The method of claim 13, further comprising:
activating a status indicator of the network-incapable industrial device when the cyber attack is detected by the network security device.

20. The method of claim 13, further comprising:
sending the request to the network security device to disable a network connection when the network-incapable industrial device is being switched off.

* * * * *